United States Patent [19]
Crane

[11] Patent Number: 5,498,915
[45] Date of Patent: Mar. 12, 1996

[54] ELECTRONICALLY SWITCHED POWER RECEPTACLE

[75] Inventor: Burke J. Crane, Lombard, Ill.

[73] Assignee: Molex Incorporated, Lisle, Ill.

[21] Appl. No.: 714,485

[22] Filed: Jun. 13, 1991

[51] Int. Cl.$^6$ .................................................. H03K 17/72
[52] U.S. Cl. ........................... 307/139; 323/263; 323/343
[58] Field of Search ............................... 307/29, 38, 139, 307/141.4, 143, 75, 85, 86, 115, 147, 148; 323/258, 263, 343

[56] References Cited

U.S. PATENT DOCUMENTS

| | | | |
|---|---|---|---|
| 3,732,486 | 5/1973 | Schoendube | 323/43.5 |
| 4,594,515 | 6/1986 | Hummel | 307/252 |

FOREIGN PATENT DOCUMENTS

| | | | |
|---|---|---|---|
| 0679961 | 10/1975 | U.S.S.R. | 323/263 |

*Primary Examiner*—Peter S. Wong
*Assistant Examiner*—Adhya Krishnan
*Attorney, Agent, or Firm*—Stephen Z. Weiss

[57] ABSTRACT

A power switching circuit selectively connects an electrical load having first and second input connections to any one of a plurality of branch power circuits. Each branch circuit includes a first and second conductor defining a relative voltage therebetween. The power switching circuit includes a selector switch for selecting which of the branch circuits is to be connected to the load. A triac is electrically connected to the first conductor of each branch circuit and to the first input connection of the load for selectively electrically connecting one of the first conductors to the first input connection. A triac is electrically connected to the second conductor of each branch circuit and to the second input connection of the load for selectively electrically connecting one of the second conductors to the second input connection. A control is operated by the selector switch for controlling the triacs to connect the respective first and second conductors of the selected branch circuit to the first and second input connections of the load.

14 Claims, 2 Drawing Sheets

ELECTRONICALLY SWITCHED POWER RECEPTACLE

FIELD OF THE INVENTION

This invention relates to electrical outlet receptacles and, more particularly, to an electronic switching circuit for such a receptacle.

BACKGROUND OF THE INVENTION

Power distribution systems properly distribute electrical power among plural loads. A typical distribution system often includes a single source of power providing power to plural electrical branch circuits. The branch circuits may provide power at equal voltage levels, as required. For example, a typical power distribution system might include a polyphase power source in a wye configuration. The voltage across any pair of windings is 208 volts AC, while the voltage between any single terminal and a common or neutral point is 120 volts AC. The branch circuits may comprise any combination of the above.

In wiring a facility, direct connections are often made between an outlet receptacle and one of the branch circuits. In such instances, the load demand or balance is, at best, estimated. It may turn out that load imbalances result owing to greater power requirements on some branch circuits than others.

The above problem is particularly acute in an office environment. With the advent of using modular furniture systems it is often desirable that lighting loads and outlet receptacles be provided as part of the modular furniture. However, such modular requirements often utilize modular wiring systems as part and parcel to the furniture components. Such systems are not conducive to hard wiring specific loads to specific branch circuits.

The present invention is intended to solve one or more of the problems discussed above in a novel and simple manner.

SUMMARY OF THE INVENTION

In accordance with the invention, there is provided a power switching circuit for selectively connecting an electrical load to any one of a plurality of branch power circuits.

Broadly, there is disclosed herein a power switching circuit for selectively connecting an electrical load having first and second input connections to any one of a plurality of branch power circuits. Each branch circuit includes a first and second conductor defining a relative voltage therebetween. The power switching circuit includes a user actuable means for selecting which of the branch circuits is to be connected to the load. First switch means are electrically connected to the first conductor of each branch circuit and to the first input connection of the load for selectively electrically connecting one of the first conductors to the first input connection. A second switch means is electrically connected to the second conductor of each branch circuit and to the second input connection of the load for selectively electrically connecting one of the second conductors to the second input connection. A control means is operated by the user actuable or automatic load sensing means for controlling the first switch means and the second switch means to connect the respective first and second conductors of the select branch circuit to the load first and second input connections.

It is a feature of the invention that the first and second switch means comprises a plurality of triacs, two for each branch circuit.

It is a further feature of the invention that the control means comprises a plurality of optocouplers, one for each triac.

It is still another feature of the invention that the actuating means comprises a manually operated selector switch or an electronic selector switch actuated by a load sensing means.

It is still a further feature of the invention that the control means is electrically powered by one of the branch circuits.

In accordance with another aspect of the invention, the power switching circuit comprises actuating means for selecting which of the branch circuits is to be connected to the load. A plurality of electrically controlled switches are each connected between the first conductor of the one branch circuit and to the first input connection of the load each for selectively electrically connecting or disconnecting the first conductor connected thereto to the first input connection. A plurality of electrically controlled switches are each connected between the second conductor of one of the branch circuits and to the second input connection of the load, each for selectively electrically connecting or disconnecting the second conductor connected thereto to the second input connection. A control means is operated by the actuating means for controlling the electrically controlled switches to connect the respective first and second conductors of the selected branch circuit to the load first and second input connections.

Further features and advantages of the invention will readily be apparent from the specification and from the drawings.

DETAILED DESCRIPTION OF THE INVENTION

Figure 1:
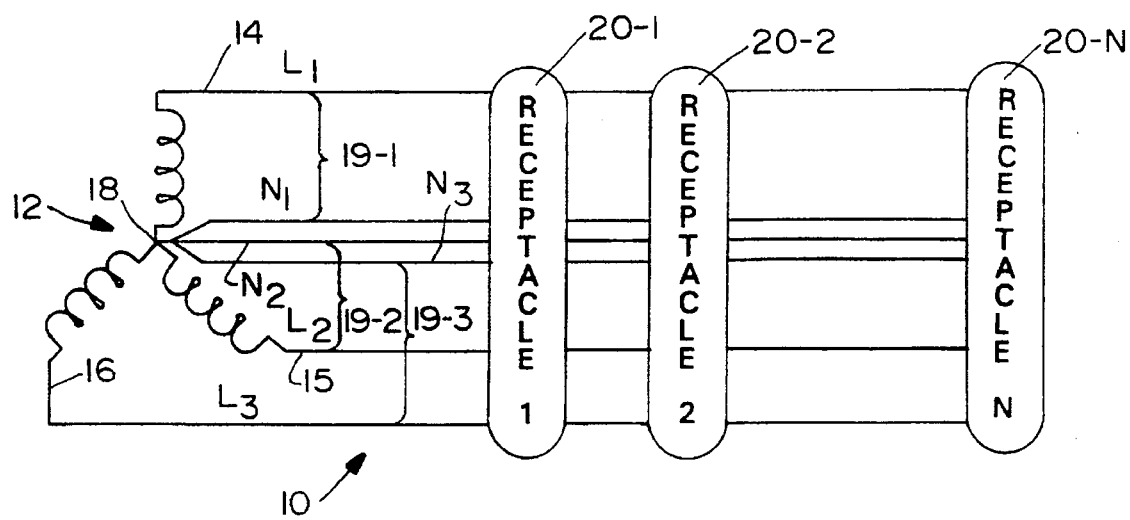
FIG. 1 is a schematic view illustrating an electrical power distribution system including electronically switched power receptacles according to the invention.

With reference to FIG. 1, a power distribution system 10 is illustrated. The power distribution system 10 includes a power source illustrated schematically in the form of a three phase wye connected winding 12. The winding 12 includes three phase terminals 14–16 and a common or neutral terminal 18. The first phase terminal 14 is connected to a conductor labelled L1. The second phase terminal 15 is connected to a conductor labelled L2. The third phase terminal 16 is connected to a conductor labelled L3. The neutral terminal 18 is connected to three conductors labelled N1–N3. With a typical power source, the voltage developed across any pair of phase terminals, i.e., terminals 14 and 15, is on the order of 208 volts AC, while the voltage between any phase terminal 14–16 and the neutral terminal 18 is 120 volts AC.

As illustrated, the power distribution system 10 includes three branch circuits 19-1 to 19-3. Each branch circuit, referred to generically as 19, includes a respective phase conductor L1-L3 and an associated respective neutral conductor N1-N3. The three branch circuits 19, each at 120 volts AC, power a plurality of N switched power receptacles 20-1 through 20-N. Each of the switched power receptacles, referred to generally as numeral 20, operates to connect a load to one of the branch circuits 19 as selected by the electronic selector switch actuated by a load sensing means or by a user.

In accordance with the invention disclosed herein, the switched power receptacle 20 utilizes 120 volt AC power. Nevertheless, the teachings of the invention could be utilized in connection with a switched power receptacle operating off of 208 volts AC, as necessary or desired.

Figure 2:
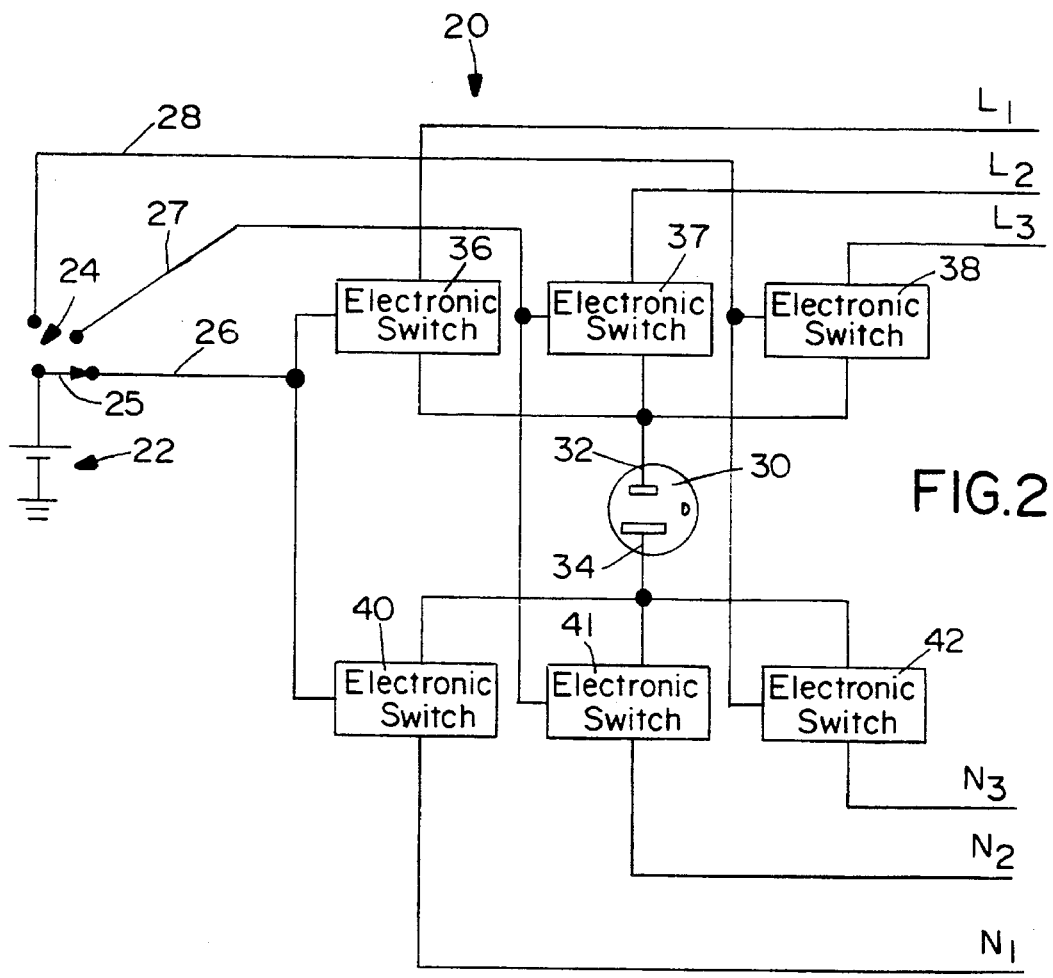
FIG. 2 is a partial schematic/block diagram illustrating the switched power receptacle according to the invention.

With reference to FIG. 2, a switched power receptacle 20 in accordance with the invention is illustrated. The switched power receptacle 20 includes a power source, represented schematically at 22, connected to a movable contact 25 of a user actuable selector switch 24. The selector switch 24 is a three position selector switch, one position for each branch circuit 19-1 to 19-3. The selector switch selectively connects the power source 22 via the movable contact 25 to one of three conductors 26–28. In accordance with the invention, the selector switch 24 is used for selecting which branch circuit 19 is to be connected to a load in the form of an outlet receptacle 30 having first and second input connections 32 and 34, respectively.

The power switched receptacle 20 includes three hot electronic switch circuits 36–38. Each electronic switch circuit 36–38 is connected between the "L" or hot conductor of one of the branch circuits 19 and the first input connection 32 of the outlet 30. For example, the first hot electronic switch circuit 36 is connected to the conductor L1 to selectively connect or disconnect the conductor L1 to the outlet first input connection 32. The power switched receptacle 20 also includes three neutral electronic switch circuits 40–42. Each electronic switch circuit 40–42 is connected between the neutral or N conductor of one of the branch circuits 19 and the second input connection 34 of the outlet 30. For example, the first neutral electronic switch circuit 40 is connected to the conductor N1 to selectively connect or disconnect the conductor N1 to the outlet second input connection 34.

The first switch conductor 26 is connected to the first electronic switch circuits 36 and 40 for controlling the same. Similarly, the second switch conductor 27 is connected to the second electronic switch circuits 37 and 41, while the third switched conductor 28 is connected to the remaining electronic switch circuits 38 and 42. Thus, the selector switch 24 selects which of the hot electronic switch circuits 36-38 and corresponding neutral electronic switch circuits 40–42 are used to connect the selected branch circuit 19 to the outlet 30.

Figure 3:
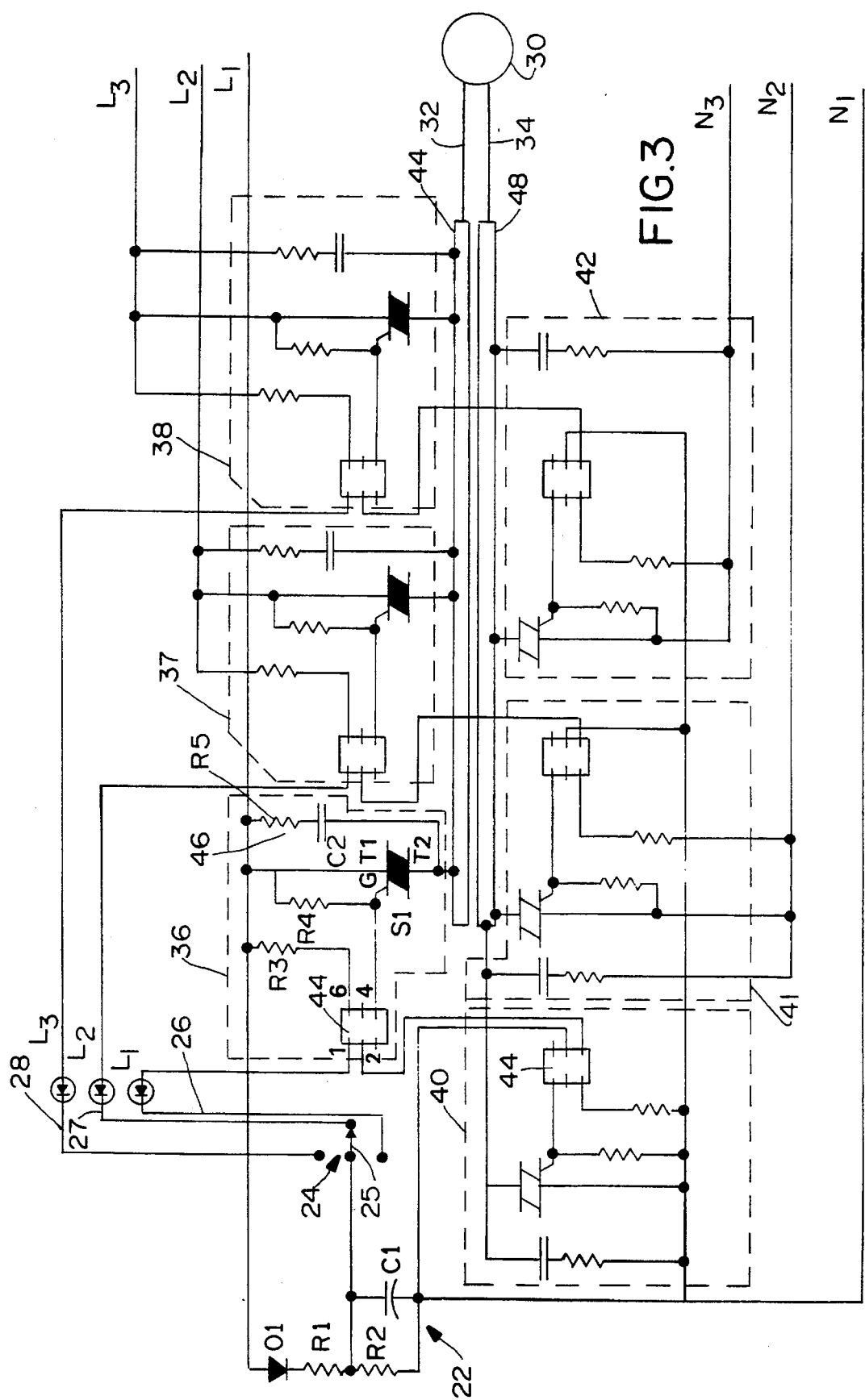
FIG. 3 is an electrical schematic diagram illustrating in greater detail the switched power receptacle according to the invention.

With reference to FIG. 3, the power switched receptacle 20 is illustrated in greater detail.

The power supply 22 is powered by the first branch circuit 19-1, i.e. the voltage supplied between the neutral conductor N1 and the hot conductor L1. The power supply 22 comprises a diode D1 connected between the conductor L1 and series connected resistors R1 and R2 to the first branch circuit neutral conductor N1. A capacitor C1 is connected across the resistor R2. The junction between the resistors R1 and R2 is connected to the movable contact 25 of the switch 24. A respective LED L1–L3 is connected in line with the respective switch conductors 26–28 to provide an indication as to the position of the movable contact 25.

The first hot electronic switch circuit 36 includes a triac S1 having a gate G and terminals T1 and T2. The terminal T1 is connected to the first branch hot conductor L1. The terminal T2 is connected to a heat sink 42 for dissipating heat in the triac S1 and for providing electrical conduction to the outlet first input connection 32. The gate G is connected to a pin 4 of a driver circuit 44. The driver circuit 44 comprises an optically driven triac, such as a Motorola Type MOC3041 circuit. Particularly, the circuit 44 comprises a zero-crossing triac driver circuit triggered by a current through terminals 1 and 2 supplied from the first switch conductor 26. The driver circuit 44 sends a current pulse to the triac S1 on each half cycle during triggering. This current pulse turns on the triac S1. The pulse is applied to the triac S1 near the zero voltage phase of the 120 volt AC wave reducing the generation of EMI.

A resistor R3 is connected between the branch conductor L1 and terminal 5 of the driver circuit 44 to provide current limiting to prevent overdriving the LED L1. A resistor R4 is connected between the triac gate G and terminal T1 to help turn off the SCR by eliminating a floating gate condition. A phase correction circuit 46 comprising a series resistor R5 and capacitor C2 is connected between the branch conductor L1 and the triac terminal T2. The phase correction circuit is necessary if there is switching from one branch circuit to another when an inductive load is connected to the receptacle 30.

Each of the other hot electronic switch circuits 37 and 38 is identical to the circuit 36 and therefore is not discussed in detail. The only difference is that the respective circuits 37 and 38 are driven by the switch conductors 27 and 28 and are powered by the respective branch circuit conductors L2 and L3.

Similarly, the neutral electronic switch circuits 40–42 are virtually identical to the corresponding hot electronic switch circuits 36–38, respectively. One difference lies in that the driver circuit 44, see the circuit 40, has terminals 1 and 2 connected between terminal 2 of the driver circuit 44 of the electronic switch circuit 36 and the first branch circuit neutral conductor N1. Thus, the trigger circuit 44 of each first electronic switch circuit 36 and 40 for the first branch circuit are series connected to ensure that the associated triacs are turned on and off concurrently.

Because the movable contact 25 of the selector switch 24 can connect the power source 22 to only one of the three conductors 26–28, only a single branch circuit can be connected to the outlet receptacle 30. Thus, the driver circuits 44 which are operated by the user actuable selector switch 24 control the triacs S1 to connect the L and N conductors of the selected branch circuit to the outlet receptacle first and second input connections 32 and 34, respectively.

The selector switch 24 may be provided remotely from the outlet receptacle 30 or may be provided on a face plate associated therewith. The selector switch 24 may comprise any known form of switch suitable for directing a low voltage current to any one pair of the three pairs, i.e. 36 and 40, 37 and 41, and 38 and 42, of electronic switch circuits. Doing so energizes the gate of the associated triac S1 allowing a high voltage current to travel therethrough to the outlet receptacle 30. Thus, for each branch circuit there is one triac S1 for the hot current carrying conductor and one triac S1 for the neutral conductor. The manually operated selector switch 24 may be replaced by an electronic selector switch actuated by load sensing means.

Approximately 22½ watts are dissipated by each active pair of triacs S1. The heat sink 44 is connected to all the hot line triacs of the circuits 36–38 while a heat sink 48 is connected to the triacs S1 of the neutral circuits 40–42 without requiring insulation between the heat sinks 44, 48 and the triacs S1. The two heat sinks 44 and 48 act as conductors to the outlet receptacle 30 and require insulation therebetween and any other metal parts of the assembly.

Thus, in accordance with the invention there is disclosed a switched power receptacle which switches an outlet receptacle to both the hot and neutral sides of any one of a plurality of branch circuits.

I claim:

1. A power switching circuit for selectively connecting an electrical load having first and second input connections to any one of a plurality of branch power circuits, each branch circuit including a first and a second conductor defining a voltage difference therebetween, comprising:

actuating means for selecting which of said branch circuits is to be connected to said load;

first switch means electrically connected to the first conductor of each branch circuit and to said first input connection of said load for selectively electrically connecting one of said first conductors to said first input connection;

second switch means electrically connected to the second conductor of each branch circuit and to said second input connection of said load for selectively electrically connecting one of said second conductors to said second input connection; and control means operated by said actuating means for controlling said first switch means and said second switch means to connect the respective first and second conductor of the selected branch circuit to said load first and second input connections.

2. The power switching circuit of claim 1 wherein each said first and said second switch means comprises a plurality of switching triacs, one for each branch circuit.

3. The power switching circuit of claim 2 wherein said control means comprises a plurality of optically driven triacs, one for each said switching triac.

4. The power switching circuit of claim 1 wherein said actuating means comprises a manually operated selector switch.

5. The power switching circuit of claim 1 wherein said control means is electrically powered by one of said branch circuits.

6. A power switching circuit for selectively connecting an electrical load having first and second input connections to any one of a plurality of branch power circuits, each branch circuit including a first and a second conductor defining a voltage difference therebetween, comprising:

actuating means for selecting which of said branch circuits is to be connected to said load;

a plurality of electrically controlled switches each connected between the first conductor of one said branch circuit and to said first input connection of said load each for selectively electrically connecting or disconnecting the first conductor connected thereto to said first input connection;

a plurality of electrically controlled switches each connected between the second conductor of one said branch circuit and to said second input connection of said load each for selectively electrically connecting or disconnecting the second conductor connected thereto to said second input connection; and control means operated by said actuating means for controlling said electrically controlled switches to connect the respective first and second conductor of the selected branch circuit to said load first and second input connections.

7. The power switching circuit of claim 6 wherein each said first and said second electrically controlled switches comprise a switching triac.

8. The power switching circuit of claim 7 wherein said control means comprises a plurality of optically driven triacs, one for each said switching triac.

9. The power switching circuit of claim 6 wherein said actuating means comprises a manually operated selector switch.

10. The power switching circuit of claim 6 wherein said control means is electrically powered by one of said branch circuits.

11. A power switching circuit for selectively connecting an electrical outlet receptacle having first and second input connections to any one of a plurality of branch power circuits, each branch circuit including a first and a second conductor defining a voltage difference therebetween, comprising:

an actuating switch for selecting which of said branch circuits is to be connected to said receptacle;

a plurality of electrically controlled switches each connected between the first conductor of one said branch circuit and to said first input connection of said receptacle each for selectively electrically connecting or disconnecting the first conductor connected thereto to said first input connection;

a plurality of electrically controlled switches each connected between the second conductor of one said branch circuit and to said second input connection of said receptacle each for selectively electrically connecting or disconnecting the second conductor connected thereto to said second input connection; and control means operated by said actuating switch for controlling said electrically controlled switches to connect the respective first and second conductor of the selected branch circuit to said receptacle first and second input connections.

12. The power switching circuit of claim 11 wherein each said first and said second electrically controlled switches comprise a switching triac.

13. The power switching circuit of claim 10 wherein said control means comprises a plurality of optically driven triacs, one for each said switching triac.

14. The power switching circuit of claim 10 wherein said actuating means comprises a manually operated selector switch.

* * * * *